(12) United States Patent
    Cassard

(10) Patent No.: US 9,684,754 B2
(45) Date of Patent: Jun. 20, 2017

(54) STANDARD CELL ARCHITECTURE LAYOUT

(71) Applicant: ARM Limited, Cambridge (GB)

(72) Inventor: Alexis Cassard, Grenoble (FR)

(73) Assignee: ARM Limited, Cambridge (GB)

(*) Notice: Subject to any disclaimer, the term of this patent is extended or adjusted under 35 U.S.C. 154(b) by 0 days.

(21) Appl. No.: 14/873,918

(22) Filed: Oct. 2, 2015

(65) Prior Publication Data
    US 2017/0098025 A1    Apr. 6, 2017

(51) Int. Cl.
    *G06F 17/50* (2006.01)
(52) U.S. Cl.
    CPC ................ *G06F 17/5072* (2013.01)
(58) Field of Classification Search
    CPC ................ G06F 17/505; G06F 17/5072
    USPC .................................... 716/119, 139
    See application file for complete search history.

(56) References Cited

U.S. PATENT DOCUMENTS

| | | | | |
|---|---|---|---|---|
| 4,701,860 A | * | 10/1987 | Mader | G06F 17/5045 326/41 |
| 5,984,510 A | * | 11/1999 | Guruswamy et al. | G06F 17/5068 716/104 |
| 6,338,972 B1 | * | 1/2002 | Sudhindranath et al. | H01L 27/0203 438/128 |
| 7,842,521 B2 | * | 11/2010 | Limb | H01L 31/022425 257/E21.219 |
| 8,037,441 B2 | * | 10/2011 | Ringe et al. | G06F 17/5077 716/119 |
| 8,443,324 B2 | * | 5/2013 | Alpert et al. | G06F 17/5031 716/119 |
| 8,612,914 B2 | * | 12/2013 | Sherlekar et al. | H01L 27/0207 716/110 |
| 8,739,104 B1 | * | 5/2014 | Penzes et al. | H01L 27/0207 716/118 |
| 9,053,289 B1 | | 6/2015 | Lamant, et al. | |
| 2005/0138595 A1 | | 6/2005 | Khakzadi, et al. | |
| 2009/0271753 A1 | | 10/2009 | Quandt, et al. | |
| 2010/0009472 A1 | * | 1/2010 | Limb | H01L 31/022425 438/16 |

OTHER PUBLICATIONS

PCT International Search Report and Written Opinion; PCT/GB2016/053006; Dec. 12, 2016.

* cited by examiner

*Primary Examiner* — Sun Lin
(74) *Attorney, Agent, or Firm* — Pramudji Law Group PLLC; Ari Pramudji

(57) ABSTRACT

Various implementations described herein are directed to providing standard cell architecture layout design. A request to activate a grid is received. A request to place at least one edge of a shape at a particular location on the grid is received from an input device. The at least one edge of the shape is automatically placed in an allowed location based on pre-defined rules.

20 Claims, 19 Drawing Sheets

STANDARD CELL ARCHITECTURE LAYOUT

BACKGROUND

As technology has advanced, tools have been created to automatically generate integrated circuit layouts based on a pattern for simple standard cells. Usually, a first set of cells is done by hand. The process for creating this first set of cells can be time consuming. Even after the first set of cells is created, the need for a manual layout may continue to be present throughout the development of a project. A manual layout may also be needed even later for very specific cells.

Prior art tools also allow for placement of shapes on layers, however, these tools cannot be used on all shapes, are based only on a regular pitch grid (nanometer grid position), do not work with discrete values, and are based only on foundry rules. Further, prior art tools that are based on nanometer grid positions allow the designer to move items to improper positions, which will produce errors that will not be found until other design checks are applied.

BRIEF DESCRIPTION OF THE DRAWINGS

Implementations of various techniques are described herein with reference to the accompanying drawings. It should be understood, however, that the accompanying drawings illustrate only the various implementations described herein and are not meant to limit the scope of various techniques described herein.

DETAILED DESCRIPTION

Figure 1:
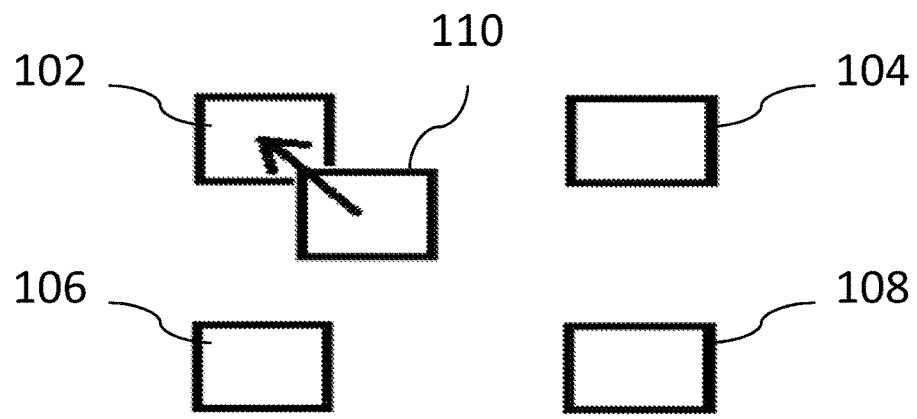
FIG. 1 illustrates a virtual grid for a via in accordance with various implementations described herein.

The present disclosure provides a tool that optimizes and accelerates manual layout development. On new nodes, standard cell architectures are defined. The standard cell architectures include grid base layouts. The grid based layouts are mainly composed of rectangular shapes and define a very limited number of possible positions for the shapes. Rules are created in the layout development tool that propose architecture positions instead of a nanometer grid position. This layout development tool could be integrated with a computer-aided design (CAD) tool and the rules could be adjustable on the fly.

The present tool provides the ability to create, copy, move, or stretch a shape from one allowed position to another, removing all of the intermediate positions so that there is no need to measure each time to verify whether foundry design rules or architecture rules are satisfied. Thus, instead of creating/copying/moving/stretching a shape based on a nanometer grid (with possibly hundreds of different positions), there is instead a low number of clear positions for each layer.

The grid values include centering attributes for different layers, e.g., via, pin, Y value of horizontal metal. The grid values also include edge attributes for the various shapes, e.g., X value of horizontal metal. The values allowed for each layer are stored in an architecture file. The architecture file may be easily and quickly accessed to provide time savings to the layout designer.

In one implementation, the present tool receives a request to move, create, or stretch a shape. When the shape is moved within to the vicinity of a proper position (based on the architectural rules), the shape is automatically snapped to a proper position. The tool does not show all of the possible positions. In one implementation, the tool only shows the proper place or position where the shape should be placed.

The tool determines where to snap using pre-defined grid coordinates or rules, e.g., grid positions, for each shape. These pre-defined grid coordinates control the various options for each shape. Grid coordinates are activated for each shape editing option, e.g., create, move, copy, and stretch. The tool will not allow a designer to place a shape anyplace that does not conform to the pre-defined grid positions.

The pre-defined rules are based on the standard cell architecture. By creating pre-defined rules based on the architecture, it is not possible to move, copy, create, or stretch a shape in a position that does not conform to the pre-defined grid coordinates. For example, in a metal layer, based on the standard cell architecture, the metal layer has fixed positions that cannot change. Every position is defined for every shape that is to be applied to this layer. If a designer desires to move a via on the metal layer, this via will only snap to positions defined for that shape in the pre-defined grid coordinates.

The pre-defined grid coordinates (left, right, bottom, top, and/or center) are saved in a file, e.g., an architecture file. These pre-defined grid coordinates are based on architectural rules for the different layers of the standard cell. The possible coordinates from the given (x, y) positions defined in the pre-defined grid are applied to each shape. The pre-defined grid coordinates provide a way to describe each shape and the possible coordinates for each shape.

A standard cell architecture normally has a plurality of layers. Standard cell architectures may also have different sizes. Standard cell architectures may have different sizes. The architecture size is determined by the number of metal pieces, e.g., tracks, that can go across the height. For example, 10 tracks that are 36 nm apart determine a 360 nm size standard cell architecture. As another example, 10 tracks that are 42 nm apart determine the 420 nm size standard cell architecture. The architecture is customized based on the foundry rules. The goal is to define an architecture that is as small as possible and still meets foundry rules. The pre-defined grid coordinates are based on the fixed positions of the layers in the architecture. The pre-defined snap on positions are based on the fixed positions of the layers in the architecture and the pre-defined grid coordinates.

Most layers of a standard cell architecture have fixed positions. In one implementation, the fixed positions can be updated or modified when the architecture changes. Once the fixed positions are modified, the shapes can be modified to meet, e.g., snap into, the new fixed positions.

When the standard cell architecture is created and is determined to be correct after performing the appropriate checks, e.g., no design rule check (DRC) errors, the architecture can be described in terms of shape coordinates. The size and position of shapes to be placed on layers within the architecture are based on the predefined grid (e.g., (x, y)) coordinates. Using the predefined grid coordinates, each shape is able to automatically be placed, i.e., snapped, into the proper position.

In one implementation the present design tool forces a designer to only go from one allowed position to another when a layer or shape is being moved, stretched, copied, or created. This eliminates the need to measure shapes and positions of the shapes each time to verify whether foundry design rules or architecture rules have been followed. In one implementation, the architecture file is created manually or generated based on a first layout containing all possible positions for all layers. The file should be humanly readable and easy to modify to be used for another purpose, for example deriving the architecture to another one in the same process.

Various implementations of a design tool that provides the ability to layout various shapes on layers of a standard cell architecture will now be described in reference to FIGS. 1-22.

FIG. 1 illustrates a virtual grid for a via in accordance with various implementations described herein. The virtual grid shows allowed positions 102, 104, 106, 108. When a via 110 is being moved, the design tool only proposes the allowed position.

Figure 2:
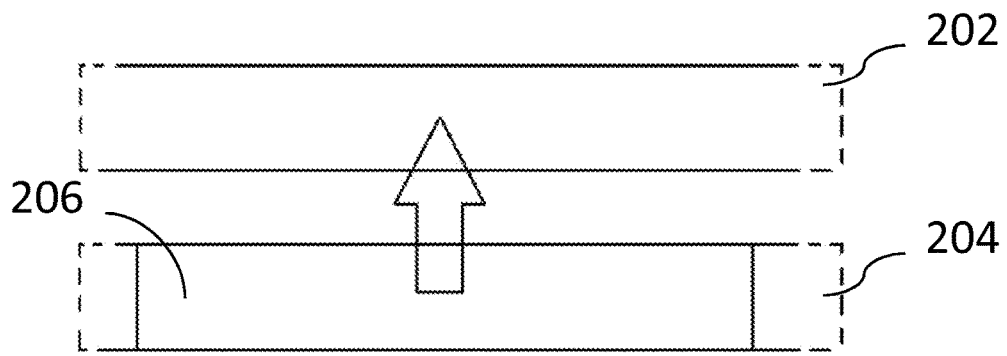
FIG. 2 illustrates moving a shape from one rail to another on a horizontal metal (M1) layer in accordance with various implementations described herein.

FIG. 2 illustrates moving a shape from one rail to another on a horizontal metal (M1) layer in accordance with various implementations described herein. In this implementation, metal 206 is moved from one rail 204 to an adjacent rail 202.

Figure 3:
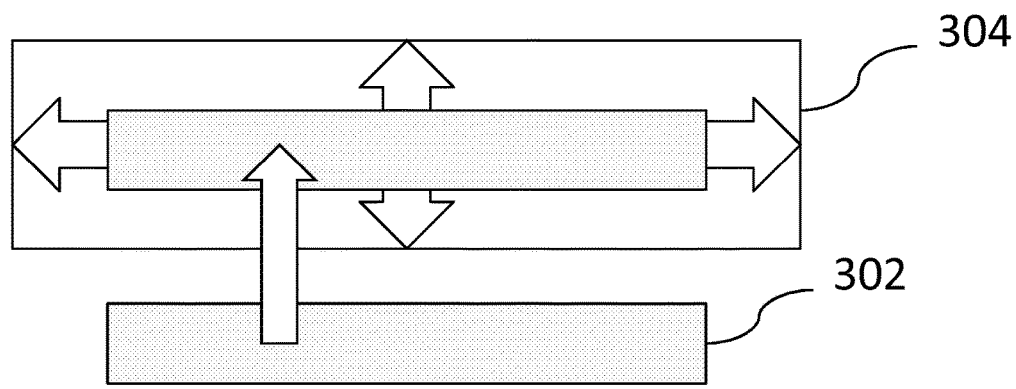
FIG. 3 illustrates moving a shape from one position to another on a horizontal layer in accordance with various implementations described herein.

FIG. 3 illustrates moving a shape 302 from one position to another on a horizontal layer in accordance with various implementations described herein. If the shape 302 is not the proper size for the location 304 to which the shape is being moved, the shaped is resized to fit its new position based on the closest possible edges.

Figure 4:
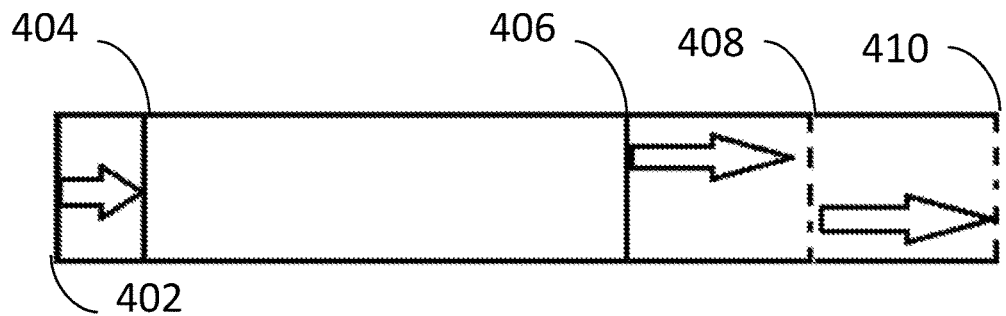
FIG. 4 illustrates stretching a shape from one position to another in accordance with various implementations described herein.
Figure 5:
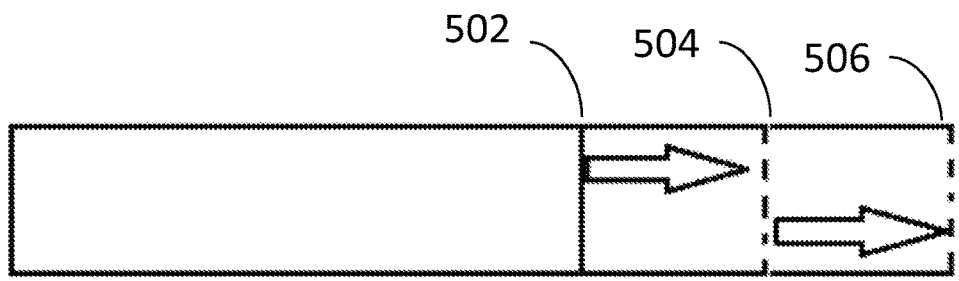
FIG. 5 illustrates stretching a shape from one position to another in accordance with various implementations described herein.
Figure 6:
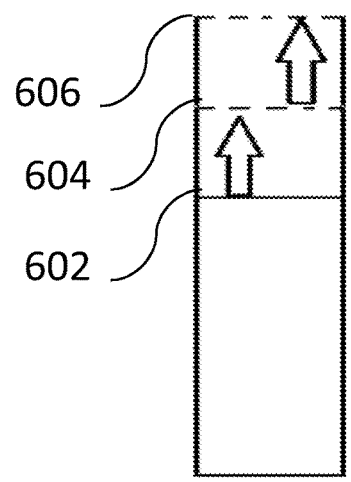
FIG. 6 illustrates stretching a shape from one position to another in accordance with various implementations described herein.

FIG. 4, FIG. 5 and FIG. 6 illustrate stretching a shape from one position to another in accordance with various implementations described herein. FIG. 4 illustrates possible left positions 402, 404 and right positions 406, 408, 410 for a shape. FIG. 5 illustrates possible right positions 502, 504, 506 for a shape. FIG. 6 illustrates possible vertical positions 602, 604, 606 for a shape.

When shapes are moved horizontally, both the left and right side of the shape should be snapped into the pre-defined positions. When stretching to the right side, the shape should snap to the closest "right side" allowed position. There is a differentiation between the edges of a shape. Having a different set of allowed positions provides better efficiency when stretching the right side or the left side of a horizontal layer or shape. This same efficiency is provided for top and bottom positions of a vertical layer or shape.

Figure 7:
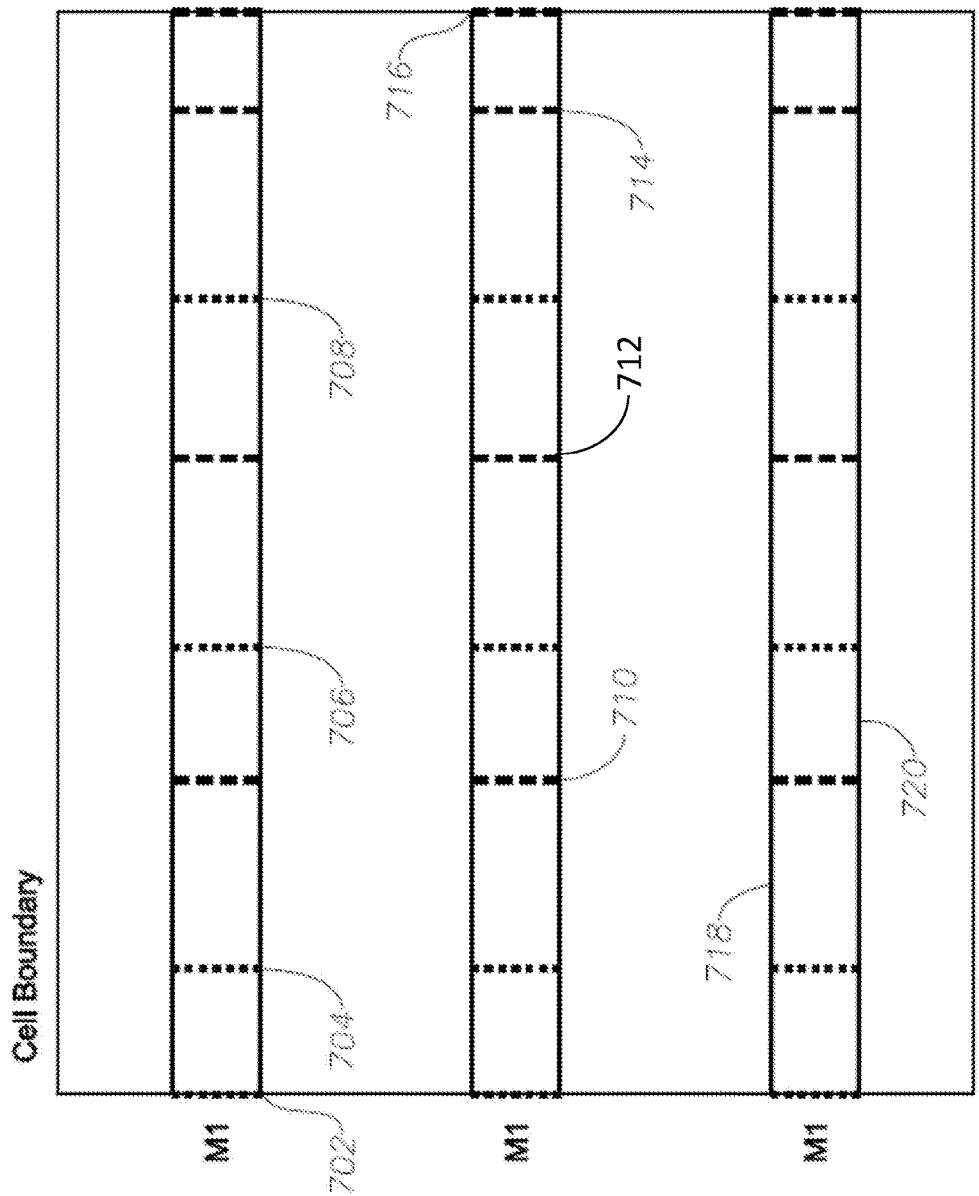
FIG. 7 illustrates a grid for a horizontal metal (M1) layer in accordance with various implementations described herein.

FIG. 7 illustrates an example of a grid for a horizontal metal (M1). In this implementation, there are three identical M1 rails. Each rail has an allowed top position and bottom position, allowed left positions, and allowed right positions. Elements 702, 704, 706, 708 show the left allowed positions for metal on one of the M1 rails. Elements 710, 712, 714, 716 show the right allowed positions on metal for one of the M1 rails. Elements 718, 720 show the top and bottom allowed positions on one of the M1 rails.

Figure 8:
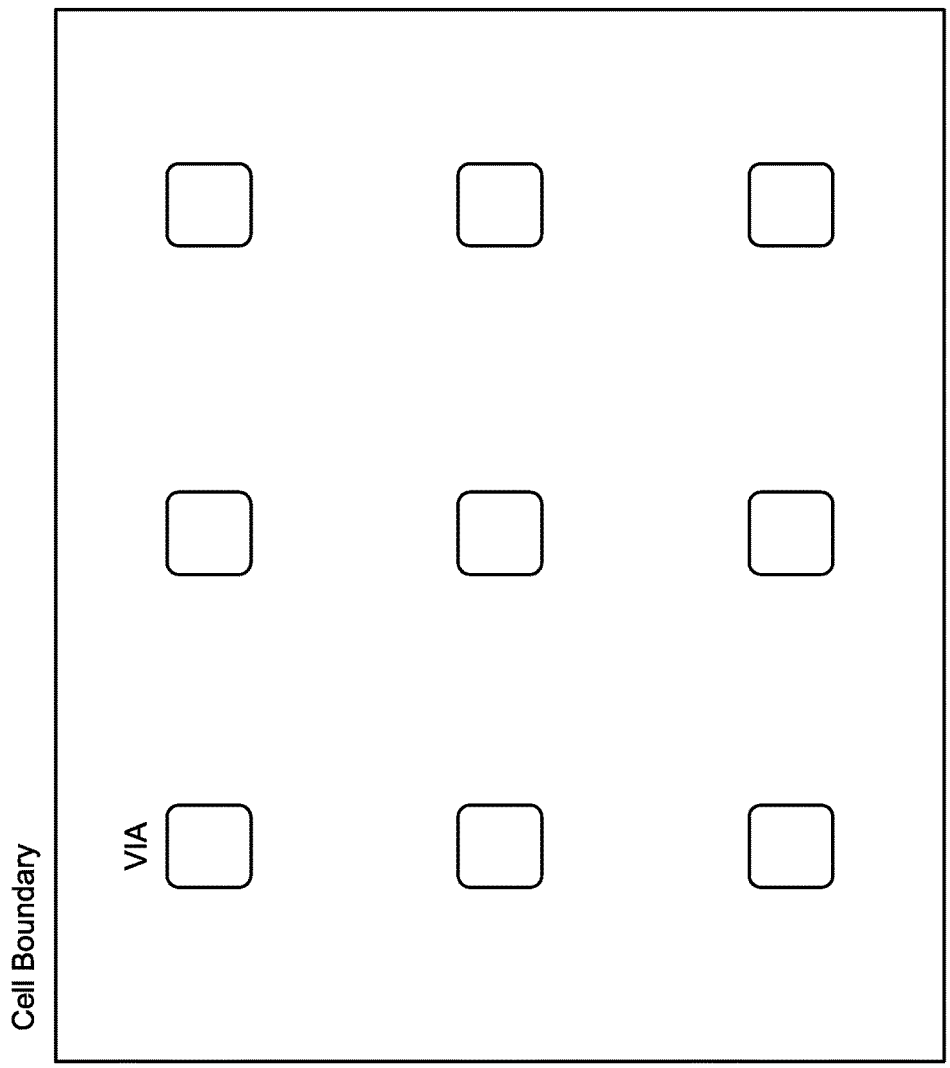
FIG. 8 illustrates a grid for a via layer in accordance with various implementations described herein.

FIG. 8 illustrates an example of a grid for via layer. In this example, positions for allowed vias are shown.

Figure 9:
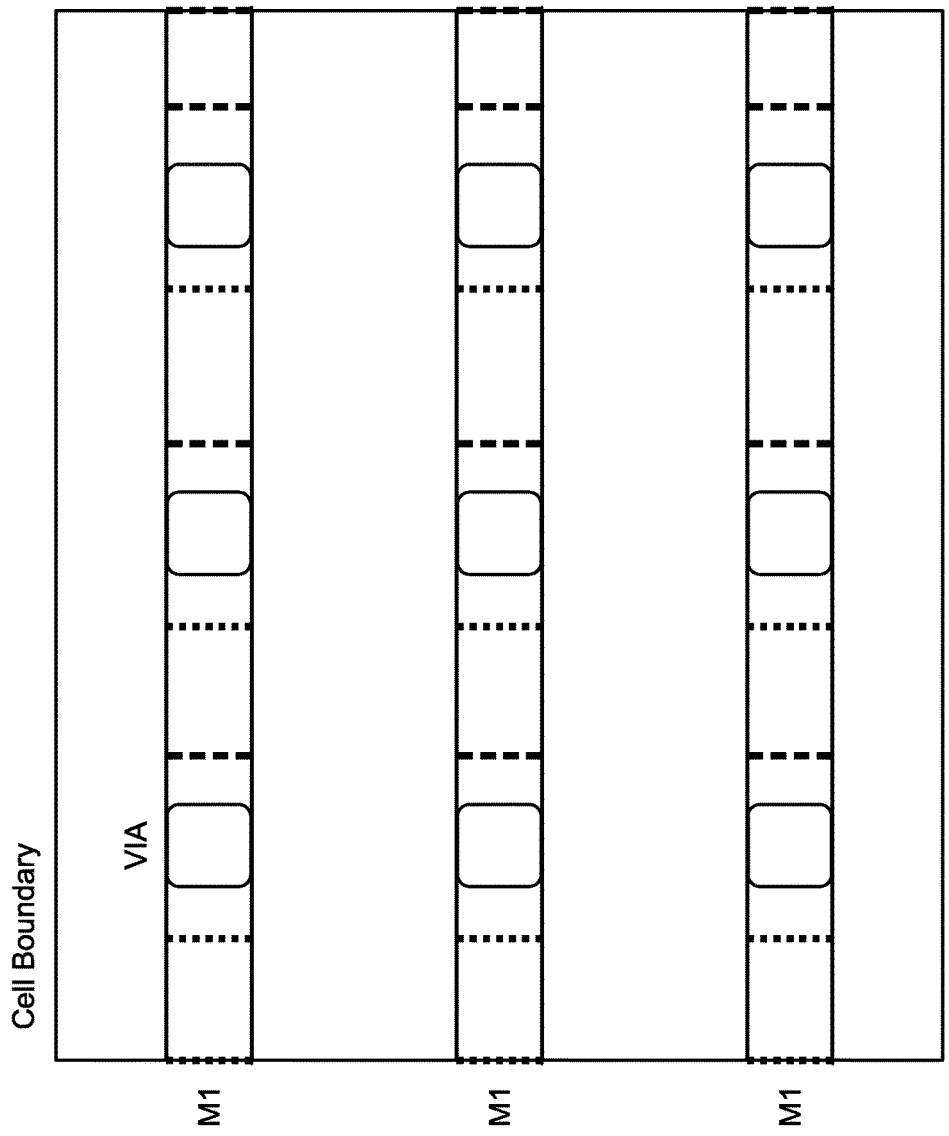
FIG. 9 illustrates a grid for a horizontal metal (M1) and via layer in accordance with various implementations described herein.

FIG. 9 illustrates an example of a grid for a horizontal metal (M1) and via layer. In this example, a combination of allowed positions for metal and vias is shown. In other words, FIG. 9 illustrates a combination of the elements shown on FIG. 7 and FIG. 8. The grid shown in FIG. 9 is used to illustrate various example shapes and how these example shapes can be moved, copied, and/or stretched as shown in FIGS. 10-19.

Figure 10:
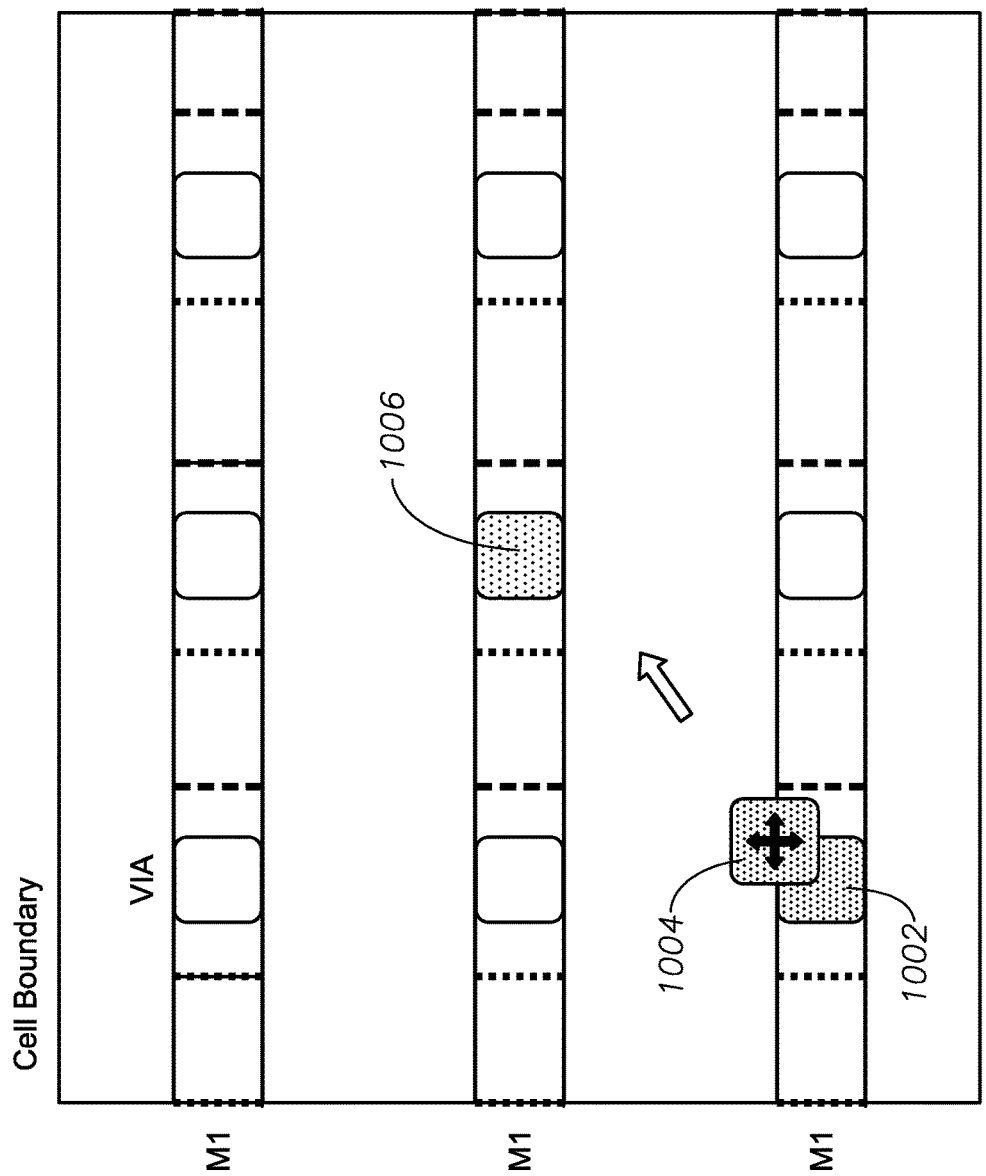
FIG. 10 illustrates a via copy and paste operation in accordance with various implementations described herein.
Figure 11:
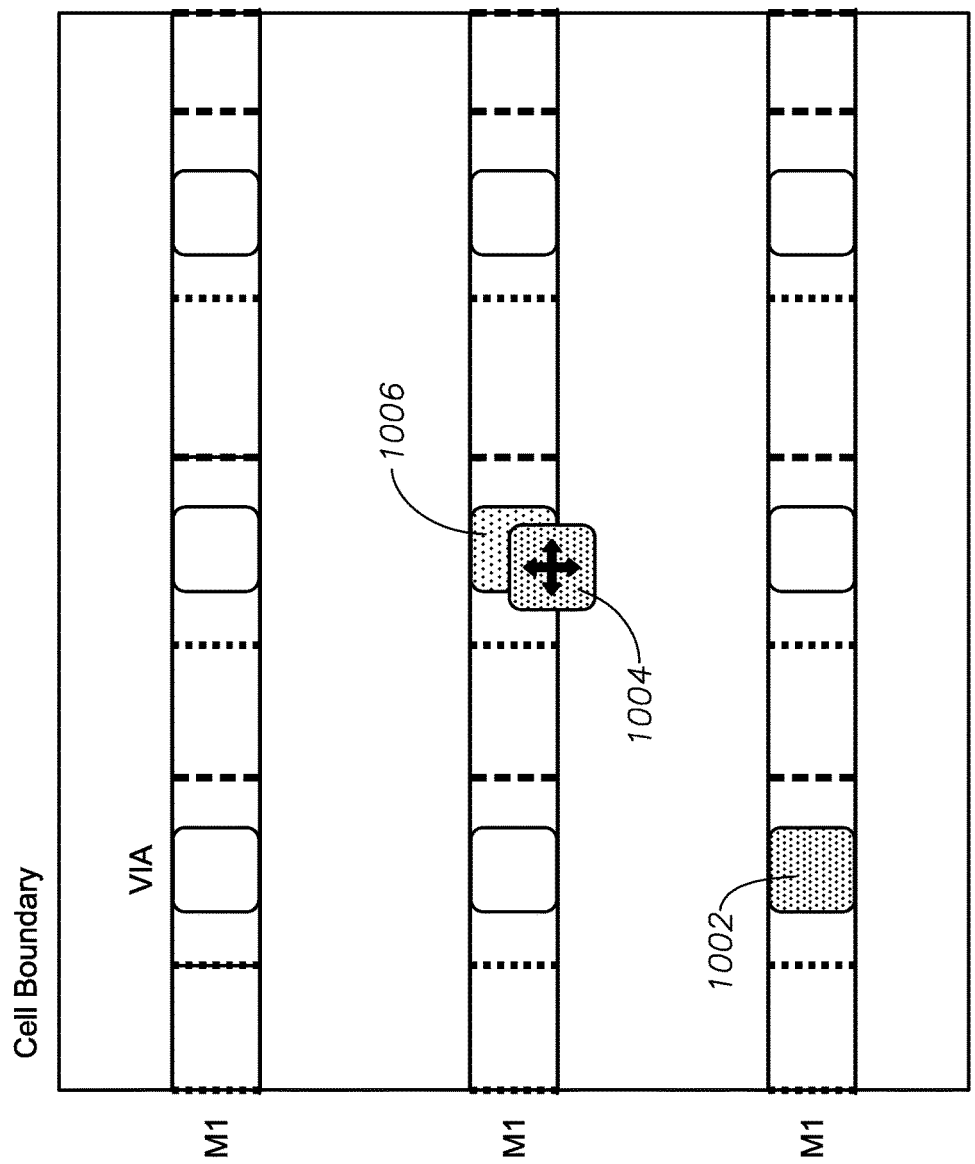
FIG. 11 illustrates a via copy and paste operation in accordance with various implementations described herein.
Figure 12:
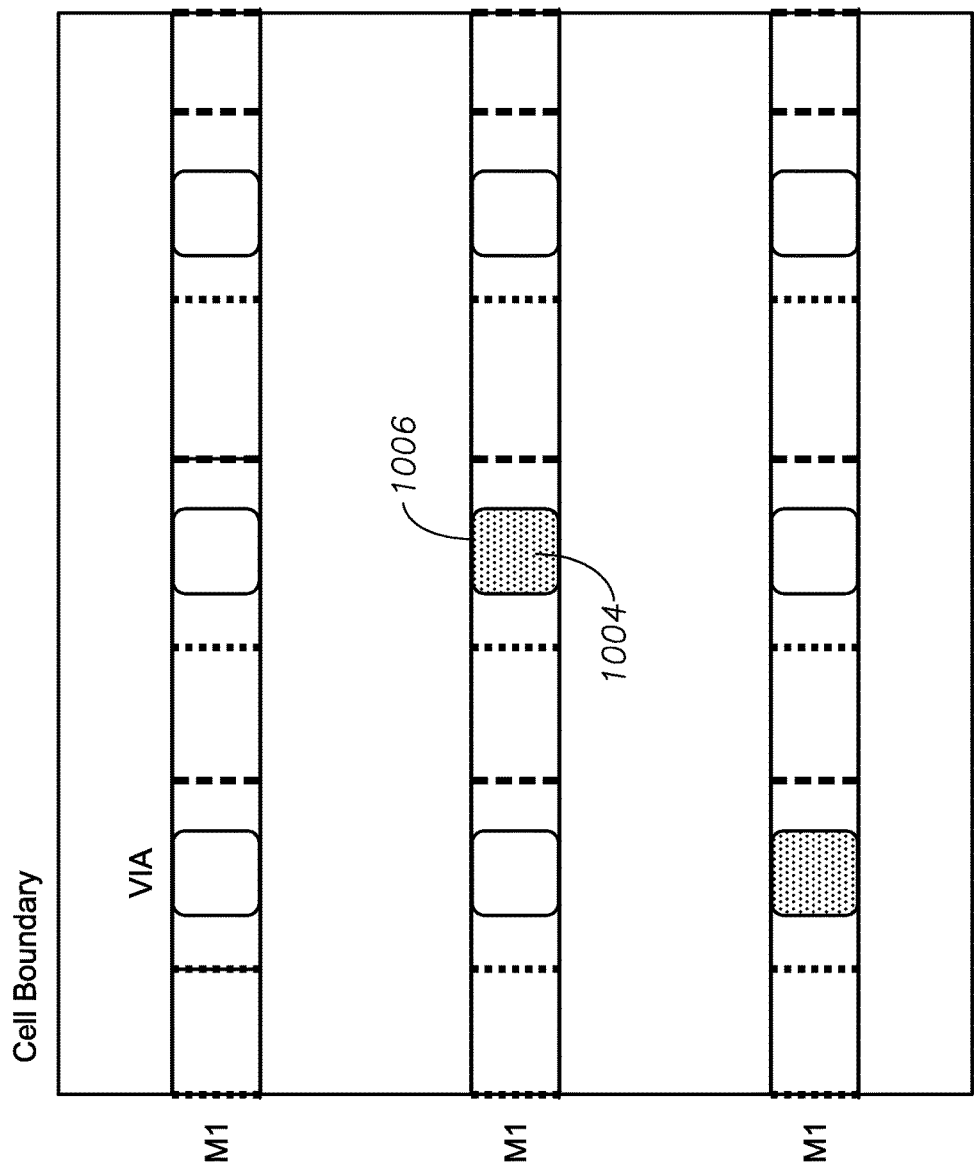
FIG. 12 illustrates a via copy and paste operation in accordance with various implementations described herein.

FIG. 10, FIG. 11 and FIG. 12 illustrate an example of a via copy and paste operation in accordance with various implementations described herein. In FIG. 10, via shape 1004 is copied from via shape 1002 located at one via position of the bottom M1 rail. Via shape 1004 is going to be moved, e.g., pasted, to via 1006. In FIG. 11, via shape 1004 is placed near via 1006 of the middle M1 rail. In FIG. 12, when via shape 1004 is placed within a threshold or approximate position (defined by the pre-defined grid rules) of via 1006, via shape 1004 snaps into place. When an existing via shape is copied and the copied via shape is moved, for example, using an input device, to an allowed position, the via shape is automatically snapped into place in the new location. The via shape is placed in the correct location when, for example, the layout designer uses the input device to drop the via shape into place.

Figure 13:
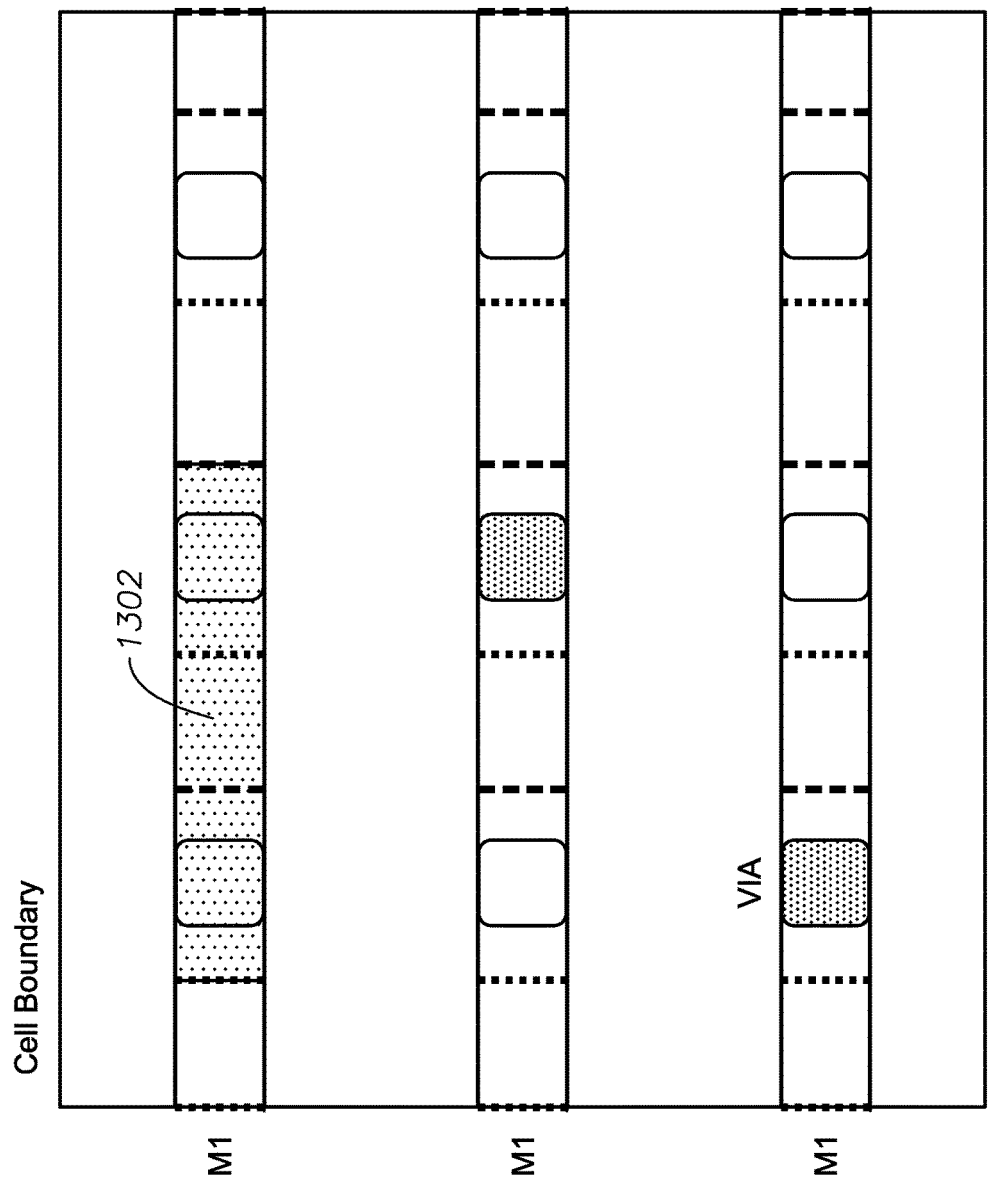
FIG. 13 illustrates a metal copy and paste operation in accordance with various implementations described herein.
Figure 14:
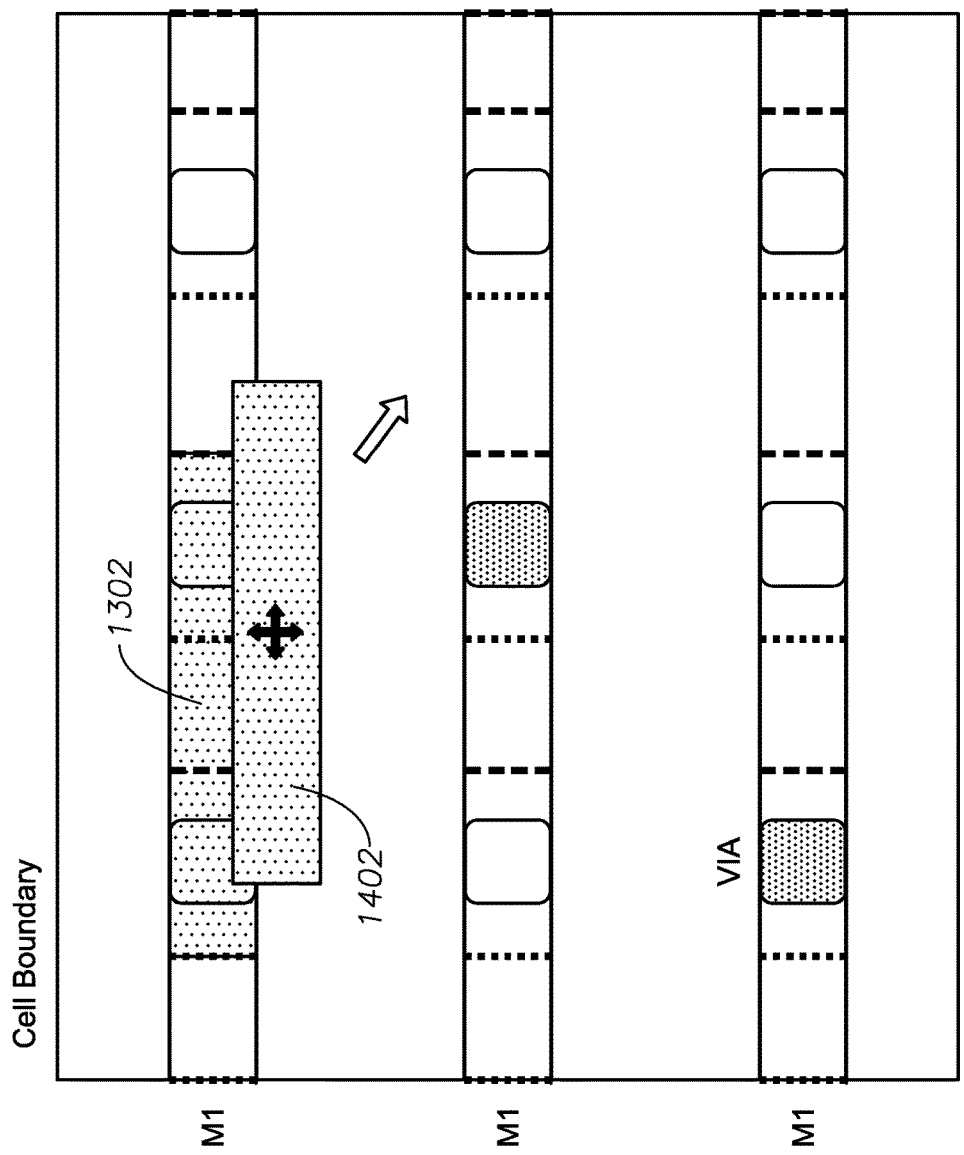
FIG. 14 illustrates a metal copy and paste operation in accordance with various implementations described herein.

FIG. 13, FIG. 14, FIG. 15 and FIG. 16 illustrate an example of a metal copy and paste operation in accordance with various implementations described herein. FIG. 13 illustrates a metal shape placed in the top M1 rail. FIG. 14 shows a copy operation of the metal 1302 in the top M1 rail. In FIG. 14, metal shape 1402 is copied from via shape 1302.

Figure 15:
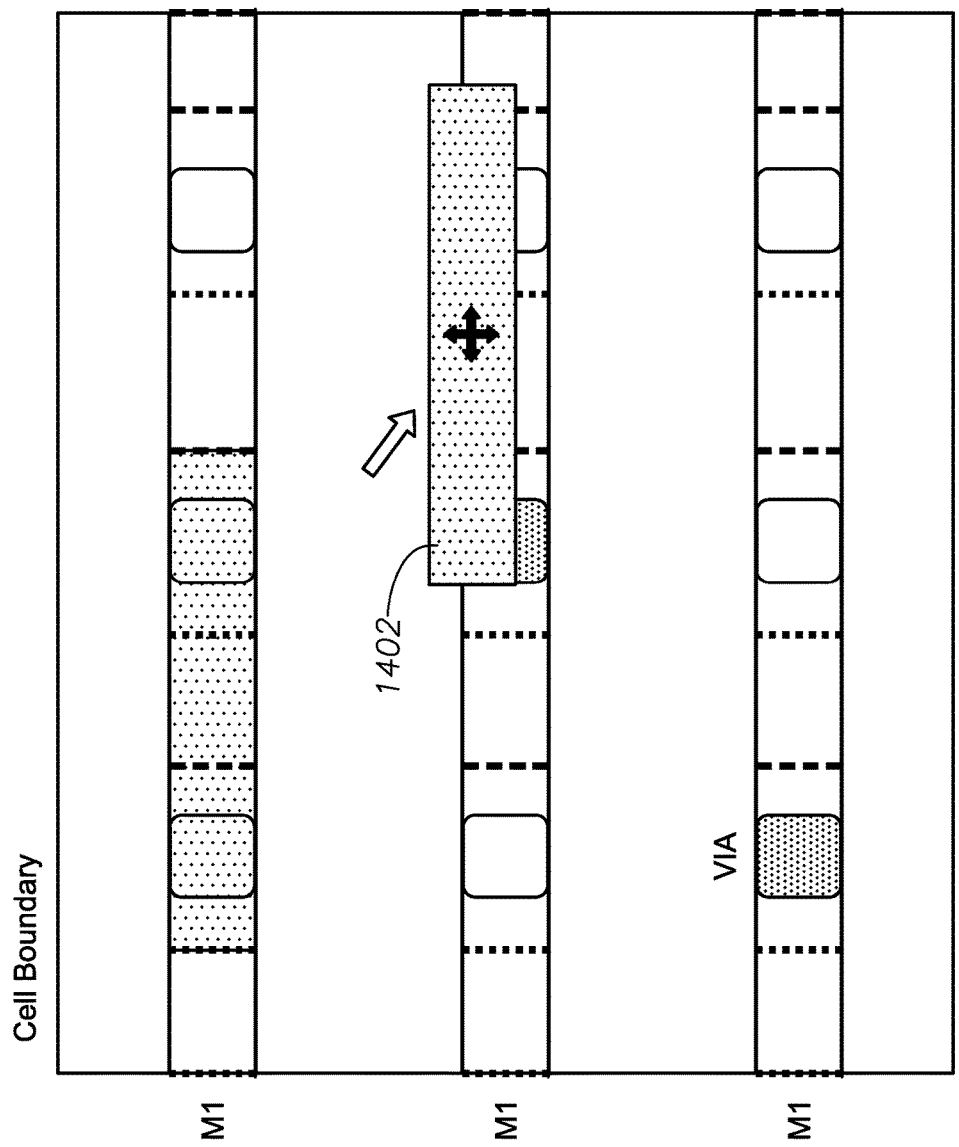
FIG. 15 illustrates a metal copy and paste operation in accordance with various implementations described herein.
Figure 16:
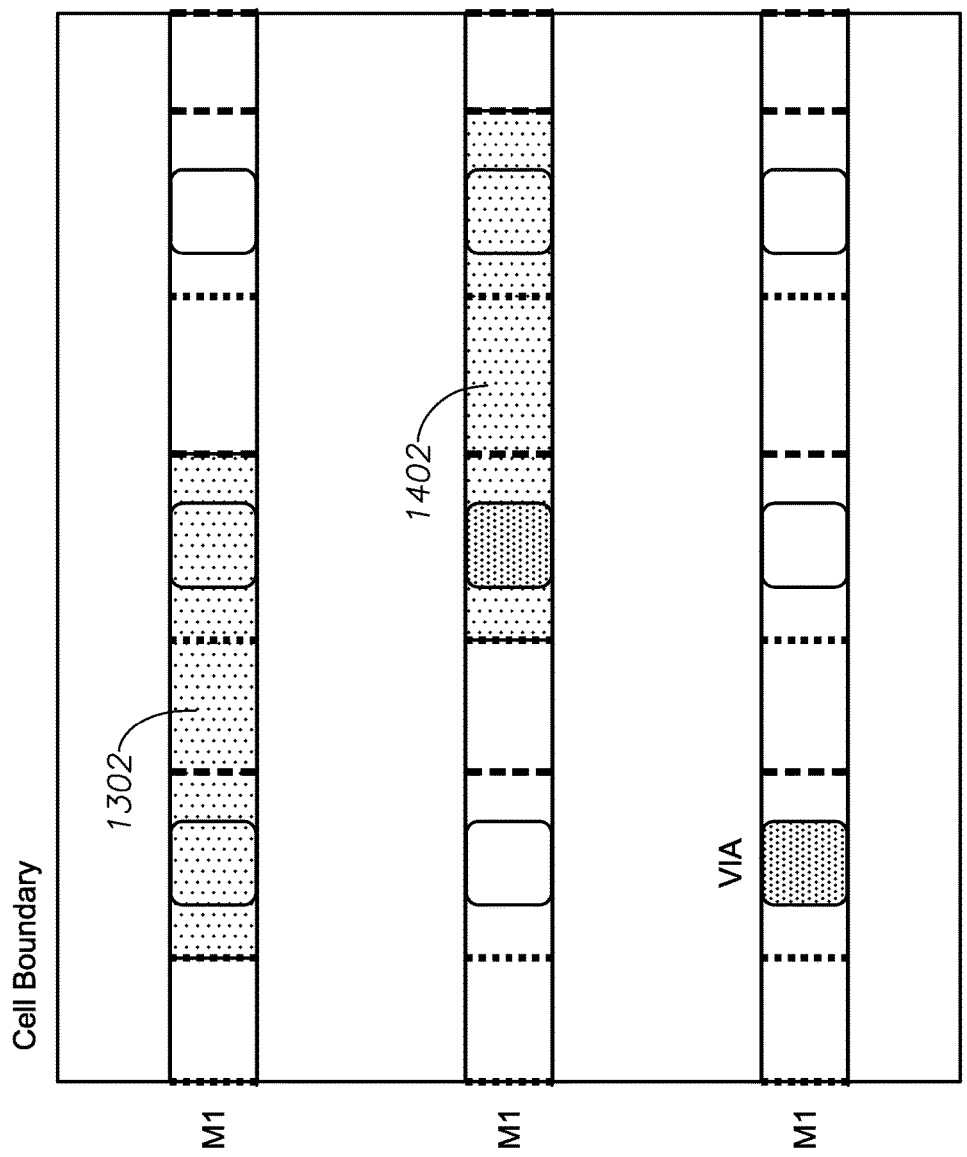
FIG. 16 illustrates a metal copy and paste operation in accordance with various implementations described herein.

Metal shape 1402 is to be moved, e.g., pasted, to a location on the middle M1 rail. In FIG. 15, metal shape 1402 is placed near a location of the middle M1 rail. In FIG. 16, when metal shape 1402 is placed within a threshold or approximate position (defined by the pre-defined grid rules) of an allowed position on the middle M1 rail, metal shape 1402 snaps into place. When an existing metal shape is copied and the copied metal shape is moved, for example, using an input device, to a new place, the metal shape is automatically resized in both width and length to fit the closest boundaries in order to snap into place in the new location. The metal shape is placed in the correct location when, for example, the layout designer uses the input device to drop the metal shape into place.

Figure 17:
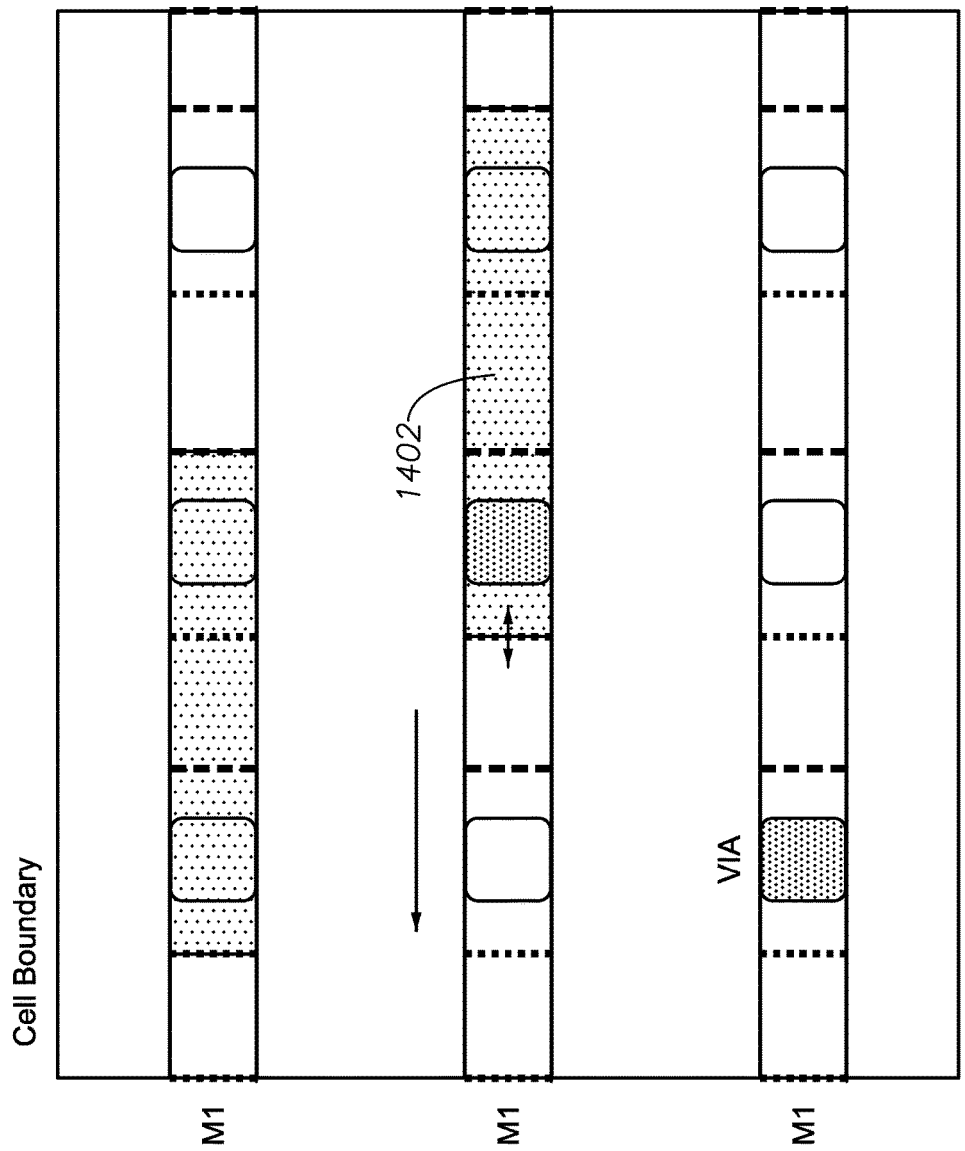
FIG. 17 illustrates a metal stretch operation in accordance with various implementations described herein.
Figure 18:
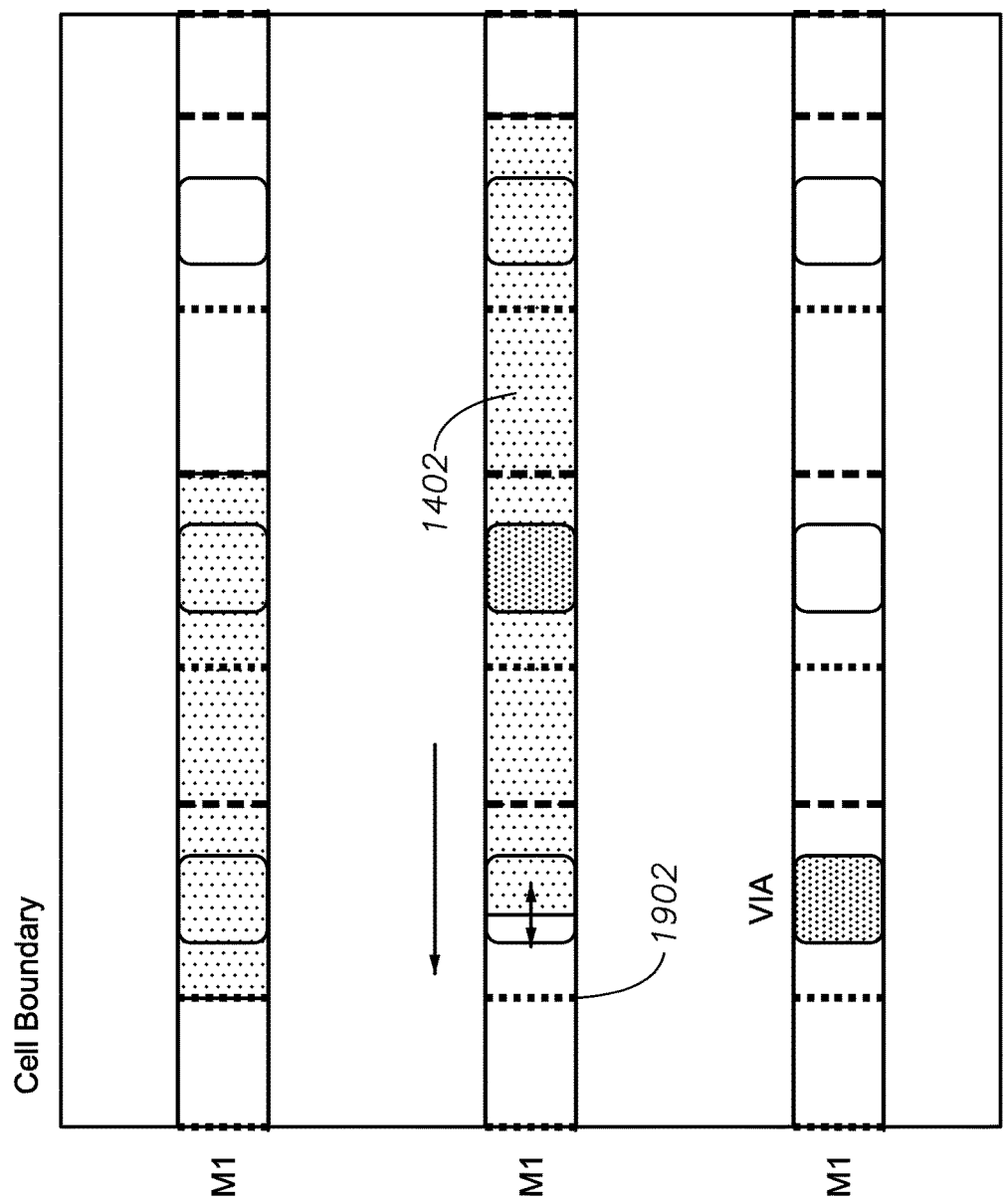
FIG. 18 illustrates a metal stretch operation in accordance with various implementations described herein.
Figure 19:
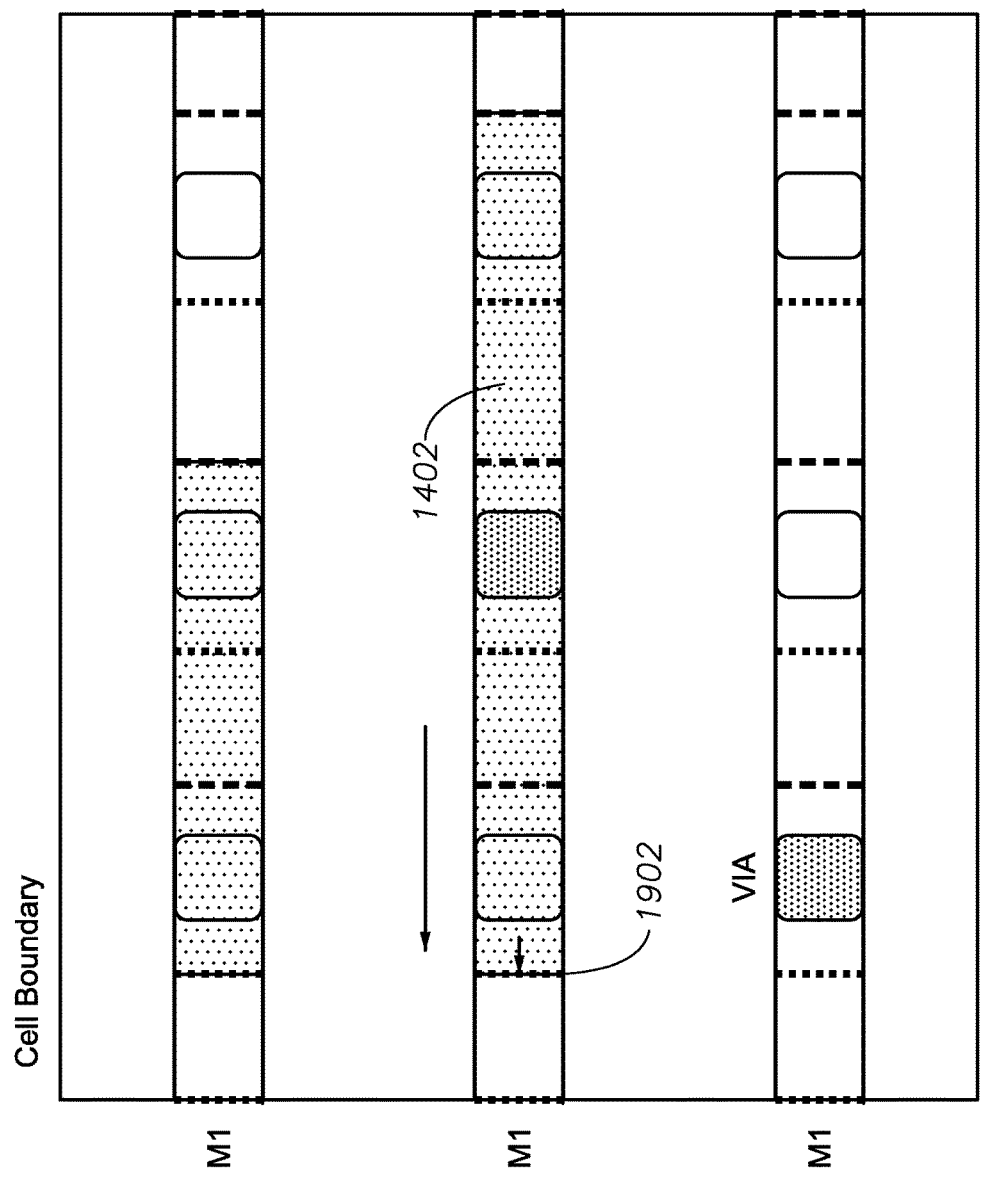
FIG. 19 illustrates a metal stretch operation in accordance with various implementations described herein.

FIG. 17 illustrates an example of a metal stretch operation in accordance with various implementations described herein. During a stretch operation the designer selects an edge of the metal shape to stretch in the "x" direction. A stretch operation is similar to a paste operation in that during the process of stretching the metal shape, the edge being moved by the designer is automatically placed in the next allowable position. FIG. 18 illustrates an intermediate position during the stretching of metal shape 1402. In FIG. 18, the left edge of metal shape 1402 has been stretched close to, i.e., within a certain distance of, an allowable position. FIG. 19 illustrates the metal shape 1402 being stretched to a pre-defined left allowable position 1902. Once the left edge of metal shape 1402 is stretched to a threshold or approximate position near left allowable position 1902, the left side of metal shape 1402 automatically snaps into place or, for example, can snap into place upon receiving an indication from an input device being used by the designer.

Figure 20:
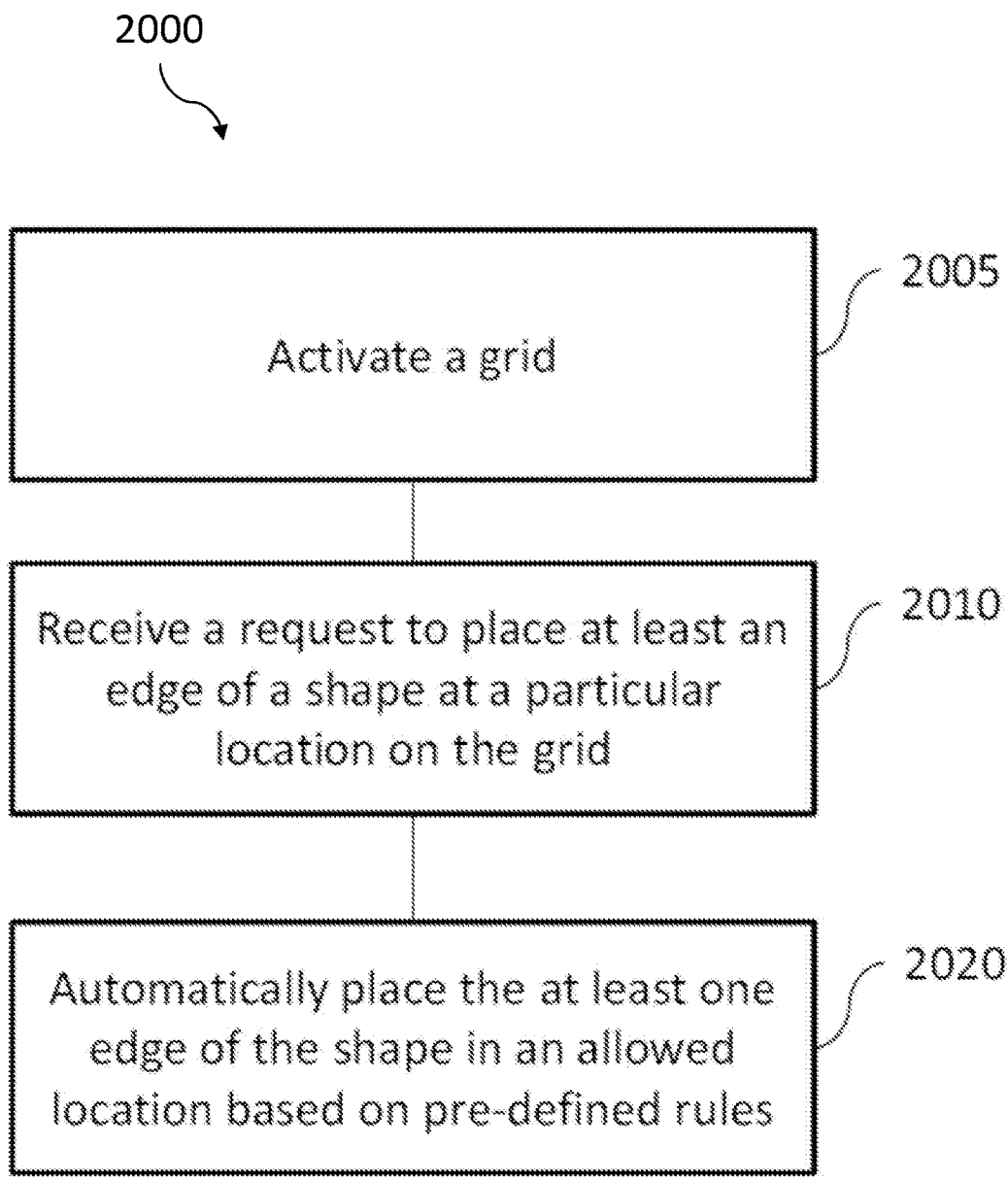
FIG. 20 illustrates a method for providing standard cell architecture layout design in accordance with various implementations described herein.

FIG. 20 illustrates a method 2000 for providing standard cell architecture layout design in accordance with various implementations described herein. In one implementation, method 2000 may be performed by a computing system. It should be understood that while method 2000 indicates a particular order of execution of operations, in some implementations, certain portions of the operations might be executed in a different order. Further, in some implementations, additional operations or steps may be added to method 2000. Likewise, some operations or steps may be omitted.

At block 2005 a grid is activated. At block 2010, a request to place at least an edge of a shape at a particular location on the grid is received from an input device. This input is configured to place the at least one edge of the shape in an approximate location. At block 2020, the at least one edge of the shape is automatically placed in an allowed location based on pre-defined rules of the standard cell architecture. An example of the pre-defined grid coordinates or rules is described below in FIG. 22.

Method 2000 is configured to determine where to place i.e., snap, the at least one edge of the shape, using pre-defined grid coordinates or rules, e.g., grid positions, for each shape. These pre-defined grid coordinates control the various options for each shape. Grid coordinates are activated for each shape option, e.g., create, move, copy, and stretch. Method 2000 is configured to prevent a designer to place a shape anyplace that does not conform to the pre-defined grid positions.

The pre-defined rules may be based on the standard cell architecture. By creating pre-defined rules based on the architecture, it is not possible to move, copy, create, or stretch a shape in a position that does not conform to the pre-defined grid coordinates. For example, in a metal layer, based on the standard cell architecture, the metal layer has fixed positions that cannot change. Every position is defined for every shape that is to be applied to this layer. If a designer desires to move a via on the metal layer, this via will only snap to positions defined for that shape in the pre-defined grid coordinates.

The pre-defined grid coordinates (left, right, bottom, top and/or center) are saved in an architecture file. These pre-defined grid coordinates are based on architectural rules for the different layers of the standard cell. The possible coordinates from the given (x, y) positions defined in the pre-defined grid are applied to each shape. The pre-defined grid coordinates provide a way to describe each shape and the possible coordinates for each shape. The pre-defined grid coordinates are not mandatory for all layers. In one implementation, the pre-defined grid coordinates are applied to a subset of the layers.

The architecture is customized based on the foundry rules. The goal of layout design is to define an architecture that is as small as possible and still meets foundry rules. The pre-defined grid coordinates are based on the fixed positions of the layers in the architecture. The pre-defined snap on positions are based on the fixed positions of the layers in the architecture and the pre-defined grid coordinates.

In one implementation, user selection of the shape is received before activating the grid. This user shape selection is meant to perform a move, copy, and/or stretch on existing shapes.

In another implementation, a shape is copied and the copied shape is placed on the grid. Edges of the shape are placed, i.e., snapped, in a closest allowed position of the allowed location.

In yet another implementation, a shape is moved from a first location to the allowed location. When a shape is moved, edges of the shape are placed in a closest allowed position of the allowed location.

In still another implementation, the at least one edge of the shape is stretched. The shape may be stretched vertically and/or horizontally. The grid allows for stretching of each edge of the shape to a plurality of allowed positions.

In one implementation, the shape is a new shape that is created and placed on the grid. An active layer of the grid is selected when the new shape is created. The active layer is the layer that will be used when creating a new shape. Edges of the shape are placed in a closest allowed position of the allowed location.

In yet another implementation, the grid is displayed to a designer. Only one or more proper positions for the shape are displayed to the designer. Displaying the proper positions in this manner helps prevent errors in layout design.

In still another implementation, the allowed location based on the pre-defined rules is described in an architectural file. The grid values are included in the architectural file. The grid values include centering attributes for different layers of the architecture. The grid values also include edge attributes for the shape.

Figure 21:
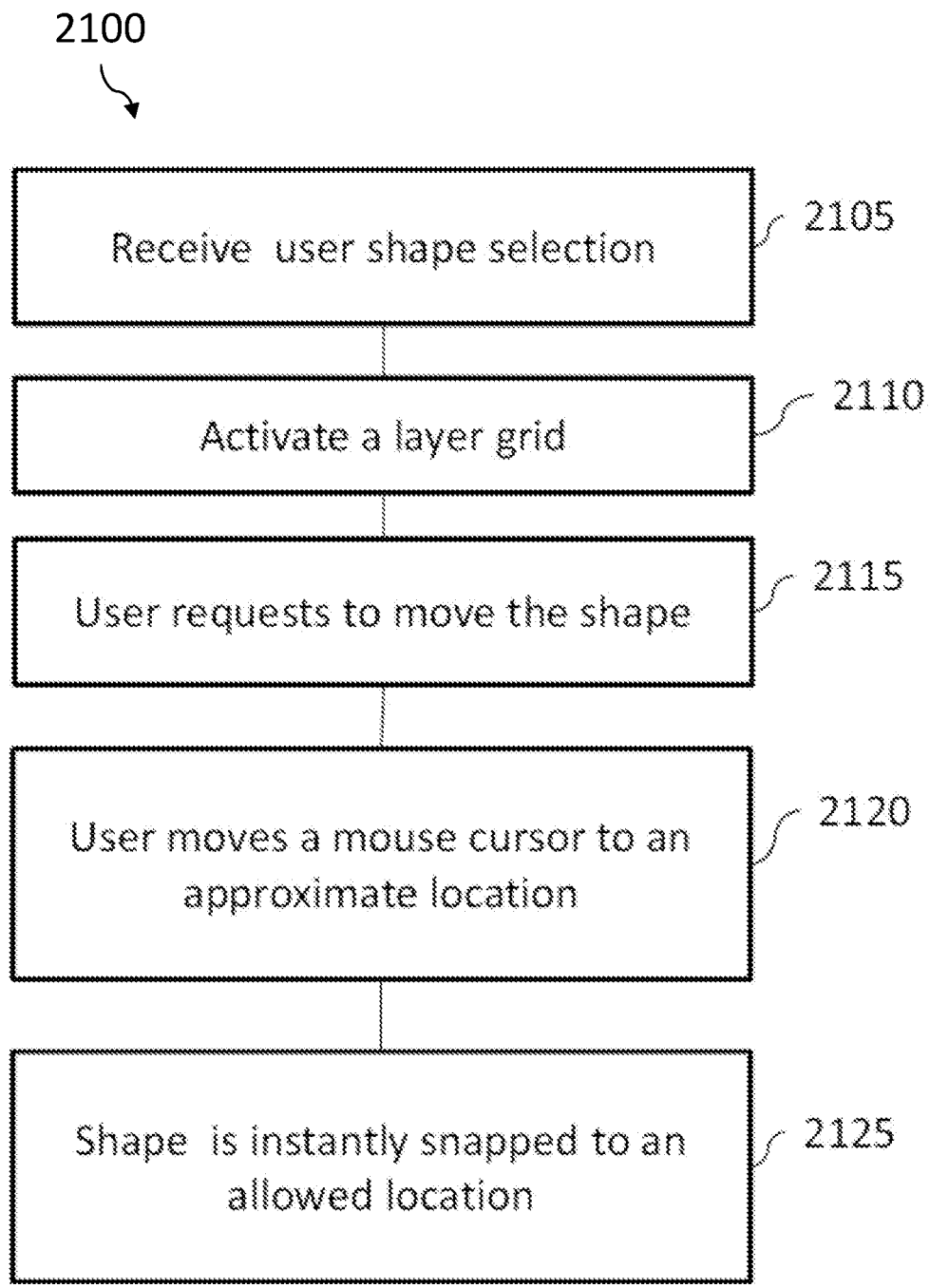
FIG. 21 illustrates a method for providing standard cell architecture layout design in accordance with various implementations described herein.

FIG. 21 illustrates an implementation of a method for providing standard cell architecture layout design in accordance with various implementations described herein. In one implementation, method 2100 may be performed by a computing system. It should be understood that while method 2100 indicates a particular order of execution of operations, in some implementations, certain portions of the operations might be executed in a different order. Further, in some implementations, additional operations or steps may be added to method 2100. Likewise, some operations or steps may be omitted.

At block 2105, a shape selection from a user is received. Shape selection provided by the user can also include selecting an edge of a shape.

At block 2110, a layer grid is activated. In one implementation, the layer grid can be displayed.

At block 2115, a user requests to move the shape. The user may also request to stretch, copy, or create a shape. When a user decides to create an object, there is no shape selection at block 2105. The active layer is taken into account for grid selection. The edges of the shape are snapped to the closest allowed position if this closest allowed position is different than the edge location for any of the edges. In the case of a move or copy operation, the shape is resized to have edges snap to the closest positions in the same manner as the create operation.

At block 2120, a user moves a mouse cursor to an approximate location. At block 2125, the shape is instantly snapped to an allowed location, e.g., placed within a pre-defined allowable area of an allowed location. The allowed locations are described in an architectural file.

Figure 22:
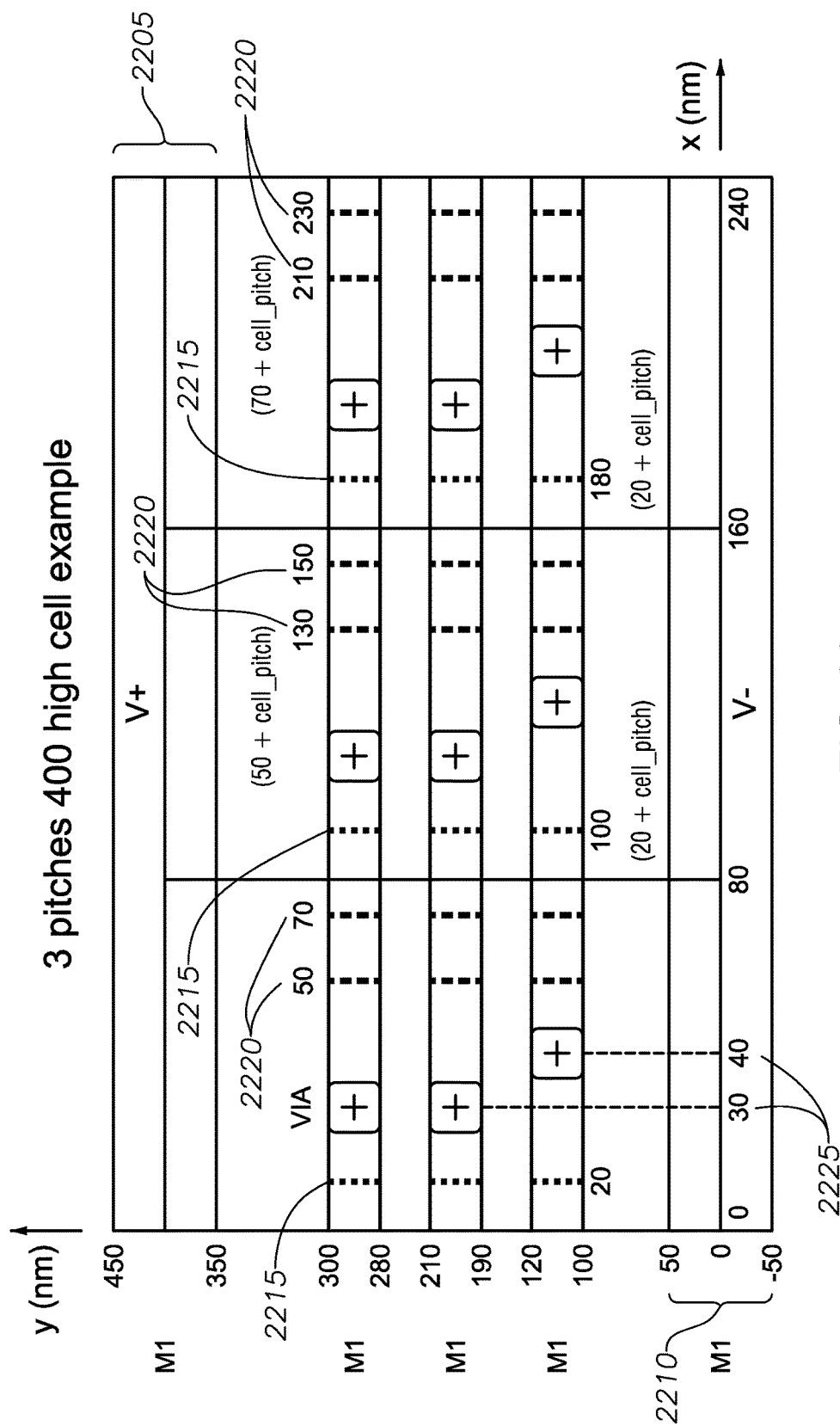
FIG. 22 illustrates example pre-defined coordinates for layers in a standard cell architecture.

FIG. 22 illustrates example pre-defined coordinates for layers in a standard cell architecture. The architecture example shown in FIG. 22 has a cell height of 400 nm.

The coordinates can be the center of the shape or the edges of the shape. These coordinates can be a relative value or an absolute value.

Elements on which the architecture can be based are cell height and architecture pitch. The cell height value is not used in this example, however, it can be useful to determine layer positions relative to the cell height. The architecture pitch is the distance between two transistor gates in a horizontal direction. Most "x" coordinates may be relative to the pitch value.

In the present example, the distance between V+ and V−, i.e., the cell height, is 400 nm. The cell pitch is 80 nm. There are three pitches shown in this example, e.g., with boundaries at 80, 160, and 240 nanometers, respectively.

FIG. 22 also illustrates five M1 rails. Each M1 rail is defined using "y" coordinate couples. There is one rail for each power net (V+ and V−) at the bottom 2210 and top of the cell 2205. The rails for each power net are 100 nm wide. The coordinates for each power net are (−50 50) and (350 450). The other three M1 rails (the rails between the top and bottom rails) are 20 nm wide and are located at the following coordinates (100 120), (190 210), and (280 300).

In this example, one predefined left edge position 2215 is defined for each pitch on the M1 rails at coordinates (100 120), (190 210), and (280 300). This left edge position is located 20 nm from the left edge of each pitch along the x-axis. For example, for each of the M1 rails, there is a left edge for each pitch, e.g., at 0 nm, 80 nm and 160 nm. As such, for the M1 rails that are not power nets, the predefined left edge position for each pitch is 20 nm, 100 nm, and 180 nm.

Two defined right edge positions 2220 are defined for each pitch on the M1 rails at coordinates (100 120), (190 210), and (280 300). Each defined right edge position is located 50 nm and 70 nm, respectively from the left edge of each pitch. As such, a first right edge of each pitch is defined along the x-axis at 50 nm, 130 nm, 210 nm, respectively. A second right edge of each pitch is defined along the x-axis at 70 nm, 150 nm, and 230 nm, respectively.

In this example, vias are the same size, e.g., 20 nm, on each side, however, this is not a requirement. Other via sizes and shapes can be utilized. There are two defined positions 2225 per pitch for vias. Possible pre-defined positions for vias in this example are placed along the x-axis at 30 nm or 40 nm measured from the left edge of the pitch to the center of the via. Thus, in this example, possible pre-defined positions for the vias for each pitch on the M1 rails at coordinates (100 120), (190 210), and (280 300) are 30 nm, 40 nm, 110 nm, 120 nm, 190 nm, and 200 nm.

Figure 23:
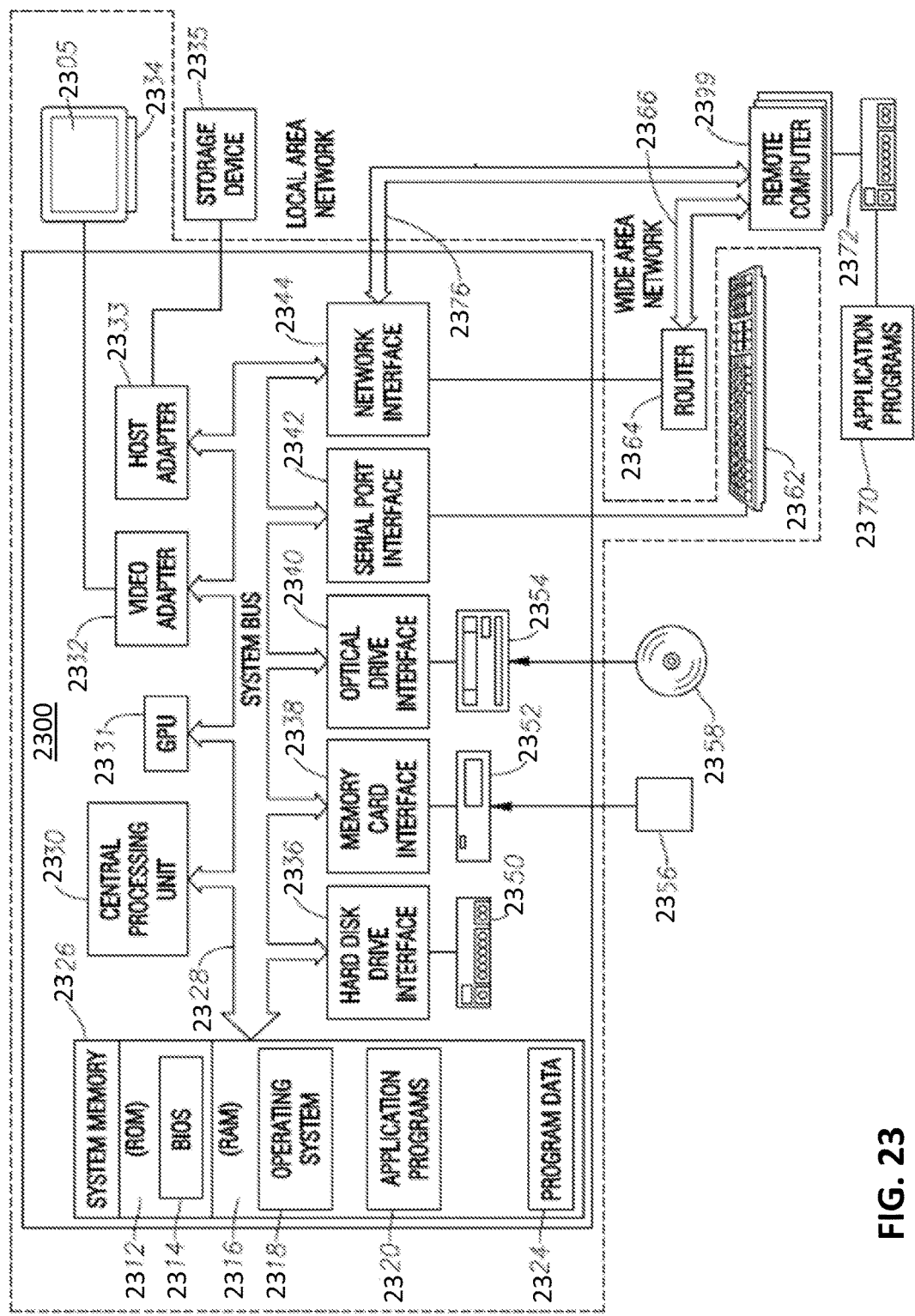
FIG. 23 illustrates computer system for providing standard cell architecture layout design in accordance with various implementations described herein.

FIG. 23 illustrates a computing system 2300 in accordance with implementations of various techniques described herein. The computing system 2300 may include a central processing unit (CPU) 2330, a system memory 2326, a graphics processing unit (GPU) 2331 and a system bus 2328 that couples various system components including the system memory 2326 to the CPU 2330. Although only one CPU 2330 is illustrated in FIG. 23, it should be understood that in some implementations the computing system 2300 may include more than one CPU 2330.

The CPU 2330 may include a microprocessor, a microcontroller, a processor, a programmable integrated circuit, or a combination thereof. The CPU 2330 can comprise an off-the-shelf processor such as a Reduced Instruction Set Computer (RISC), or a Microprocessor without Interlocked Pipeline Stages (MIPS) processor, or a combination thereof. The CPU 2330 may also include a proprietary processor.

The GPU 2331 may be a microprocessor specifically designed to manipulate and implement computer graphics. The CPU 2330 may offload work to the GPU 2331. The GPU 2331 may have its own graphics memory, and/or may have access to a portion of the system memory 2326. As with the CPU 2330, the GPU 2331 may include one or more processing units, and each processing unit may include one or more cores.

The CPU 2330 may provide output data to a GPU 2331. The GPU 2331 may generate graphical user interfaces that present the output data. The GPU 2331 may also provide objects, such as menus, in the graphical user interface. A user may provide inputs by interacting with the objects. The GPU 2331 may receive the inputs from interaction with the objects and provide the inputs to the CPU 2330. A video adapter 2332 may be provided to convert graphical data into signals for a monitor 2334. The monitor 2334 includes a screen 2305. In certain implementations, the screen 2305 may be sensitive to touching by a finger. In other implementations, the screen 2305 may be sensitive to the body heat from the finger, a stylus, or responsive to a mouse. Additionally, in certain implementations, the screen may have the capability of displaying more than one plan position indicator (PPI).

The system bus 2328 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory 2326 may include a read only memory (ROM) 2312 and a random access memory (RAM) 2316. A basic input/output system (BIOS) 2314, containing the basic routines that help transfer information between elements within the computing system 2300, such as during start-up, may be stored in the ROM 2312.

The computing system 2300 may further include a hard disk drive interface 2336 for reading from and writing to a hard disk 2350, a memory card reader 2352 for reading from and writing to a removable memory card 2356, and an optical disk drive 2354 for reading from and writing to a removable optical disk 2358, such as a CD ROM or other optical media. The hard disk 2350, the memory card reader 2352, and the optical disk drive 2354 may be connected to the system bus 2328 by a hard disk drive interface 2336, a memory card reader interface 2338, and an optical drive interface 2340, respectively. The drives and their associated computer-readable media may provide nonvolatile storage of computer-readable instructions, data structures, program modules and other data for the computing system 2300.

Although the computing system 2300 is described herein as having a hard disk, a removable memory card 2356 and a removable optical disk 2358, it should be appreciated by those skilled in the art that the computing system 2300 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 2300. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The computing system 2300 may also include a host adapter 2333 that connects to a storage device 2335 via a small computer system interface (SCSI) bus, a Fiber Channel bus, an eSATA bus, or using any other applicable computer bus interface.

The computing system 2300 can also be connected to a router 2364 to establish a wide area network (WAN) 2366 with one or more remote computers 2374. The router 2364 may be connected to the system bus 2328 via a network interface 2344. The remote computers 2374 can also include hard disks 2372 that store application programs 2370.

In another implementation, the computing system 2300 may also connect to the remote computers 2374 via local area network (LAN) 2376 or the WAN 2366. When using a LAN networking environment, the computing system 2300 may be connected to the LAN 2376 through the network interface or adapter 2344. The LAN 2376 may be implemented via a wired connection or a wireless connection. The LAN 2376 may be implemented using Wi-Fi™ technology, cellular technology, Bluetooth™ technology, satellite technology, or any other implementation known to those skilled in the art. The network interface 2344 may also utilize remote access technologies (e.g., Remote Access Service (RAS), Virtual Private Networking (VPN), Secure Socket Layer (SSL), Layer 6 Tunneling (L2T), or any other suitable protocol). These remote access technologies may be implemented in connection with the remote computers 2374. It will be appreciated that the network connections shown are exemplary and other means of establishing a communications link between the computer systems may be used.

A number of program modules may be stored on the hard disk 2350, memory card 2356, optical disk 2358, ROM 2312 or RAM 2316, including an operating system 2318, one or more application programs 2320, and program data 2324. In certain implementations, the hard disk 2350 may store a database system. The database system could include, for example, recorded points. The application programs 2320 may include various mobile applications ("apps") and other applications configured to perform various methods and techniques described herein. The operating system 2318 may be any suitable operating system that may control the operation of a networked personal or server computer.

A user may enter commands and information into the computing system 2300 through input devices such as buttons 2362, which may be physical buttons, virtual buttons, or combinations thereof. Other input devices may include a microphone, a mouse, or the like (not shown). These and other input devices may be connected to the CPU 2330 through a serial port interface 2342 coupled to system bus 2328, but may be connected by other interfaces, such as a parallel port, game port or a universal serial bus (USB).

In one implementation, the one or more application programs 2320 or 2370 stored in the computer-readable media can include a plurality of instructions that when executed by a processing unit, such as a CPU 2330, cause the computing system to perform any of the techniques, or portions thereof, that are described herein.

The layout tool of the present disclosure provides fast rules coding and allows rule changes on the fly. In addition, the present tool includes a switch functionality that may be used to easily disable/enable the tool.

The present disclosure provides several advantages:
- Efficiency may be increased on manual layout design. There is no need to check the x or y value of a shape while modifying. There is no need to use a ruler. Checking the position of the layer can be done visually with no need to zoom to be more precise when drawing.
- Layout consistency may be provided. Because the layout is on a grid, a cleaner and repetitive layout is provided across a library.
- It becomes easier to derive a whole library of shapes, and the number of possible patterns is reduced.
- Errors may be reduced. Situations that can cause an error become readily apparent, for example, when there is a gap between two consecutive positions for each layer.
- Learning time may be reduced for layout designers that are new to a project.

Described herein are implementations of various technologies for providing standard cell architecture layout design. A request to activate a grid is received. A request to place at least one edge of a shape at a particular location on the grid is received from an input device. The at least one edge of the shape is automatically placed in an allowed location based on pre-defined rules.

Described herein is also a non-transitory computer-readable medium having stored thereon a plurality of computer-executable instructions which, when executed by a computer, cause the computer to: receive a request to activate a grid, receive a request to place at least one edge of a shape at a particular location on the grid from an input device, and automatically place the at least one edge of the shape in an allowed location based on pre-defined rules.

Described herein is also a device, including a computer system having a processor and memory having stored thereon a plurality of executable instructions which, when executed by the processor, cause the processor to: receive a request to activate a grid, receive a request to place at least one edge of a shape at a particular location on the grid from an input device, and automatically place the at least one edge of the shape in an allowed location based on pre-defined rules.

In one implementation, a user selection of the shape is received before activating the grid. The shape can be copied and placed on the grid. Edges of the shape can be placed in a pre-defined position within the allowed location. The shape can be moved from a first location to the allowed location. Moving the shape from the first location to the allowed location can include placing edges of the shape in a pre-defined position within the allowed location.

In another implementation, the pre-defined rules are based on a standard cell architecture. The pre-defined rules can include pre-defined grid coordinates. Coordinates defined in the pre-defined grid coordinates can be applied to each shape. The grid allows for stretching of each edge of the shape to a plurality of allowed positions.

In yet another implementation, the shape is a new shape that is created and placed on the grid. A layer of the grid is selected when the new shape is created. Edges of the new shape can be placed in a pre-defined position within the allowed location.

In again another implementation, one or more allowed positions are displayed for the shape.

In a further implementation, the allowed location based on the pre-defined rules is described in an architecture file. Grid values can be included in the architecture file. The grid values can include centering attributes for different layers of the grid. The grid values can include edge attributes for the shape.

The discussion of the present disclosure is directed to certain specific implementations. It should be understood that the discussion of the present disclosure is provided for the purpose of enabling a person with ordinary skill in the art to make and use any subject matter defined herein by the subject matter of the claims.

It should be intended that the subject matter of the claims not be limited to the implementations and illustrations provided herein, but include modified forms of those implementations including portions of the implementations and combinations of elements of different implementations within the scope of the claims. It should be appreciated that in the development of any such implementation, as in any engineering or design project, numerous implementation-specific decisions should be made to achieve a developers' specific goals, such as compliance with system-related and business related constraints, which may vary from one implementation to another. Moreover, it should be appreciated that such a development effort maybe complex and time consuming, but would nevertheless be a routine undertaking of design, fabrication, and manufacture for those of ordinary skill having benefit of this disclosure. Nothing in this application should be considered critical or essential to the claimed subject matter unless explicitly indicated as being "critical" or "essential."

Reference has been made in detail to various implementations, examples of which are illustrated in the accompanying drawings and figures. In the following detailed description, numerous specific details are set forth to provide a thorough understanding of the present disclosure. However, the present disclosure may be practiced without these specific details. In other instances, well-known methods, procedures, components, circuits and networks have not been described in detail so as not to unnecessarily obscure aspects of the embodiments.

It should also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the present disclosure herein is for the purpose of describing particular implementations and is not intended to limit the present disclosure. As used in the description of the present disclosure and appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "includes," "including," "comprises," and/or "comprising," when used in this specification, specify a presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. As used herein, the terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to implementations of various techniques described herein, other and further implementations may be devised without departing from the basic scope thereof, which may be determined by the claims that follow.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for providing standard cell architecture layout design, the method comprising:
   receiving a request to activate a grid;
   receiving, from an input device, a request to place at least one edge of a shape at a location on the grid; and
   automatically placing the at least one edge of the shape in a pre-defined area of the grid when the location of the request is within a threshold position of the pre-defined area.

2. The method of claim 1, further comprising receiving a user selection of the shape before activating the grid.

3. The method of claim 2, further comprising:
copying the shape; and
placing the copied shape on the grid.

4. The method of claim 3, wherein edges of the shape are placed in pre-defined positions within the pre-defined area.

5. The method of claim 2, further comprising moving the shape from a first location to the pre-defined area.

6. The method of claim 5, wherein moving the shape from the first location to the pre-defined area comprises placing edges of the shape in pre-defined positions within the pre-defined area.

7. The method of claim 1, wherein pre-defined rules for automatically placing the at least one edge of the shape in a pre-defined area of the grid are based on a standard cell architecture.

8. The method of claim 7, wherein the pre-defined rules include pre-defined grid coordinates.

9. The method of claim 8, further comprising applying coordinates defined in the pre-defined grid coordinates to each shape.

10. The method of claim 7, wherein the grid allows for stretching each edge of the shape to a plurality of allowed positions.

11. The method of claim 1, wherein the shape is a new shape that is created and placed on the grid.

12. The method of claim 11, further comprising selecting a layer of the grid when the new shape is created.

13. The method of claim 12, further comprising placing edges of the new shape in pre-defined positions within the pre-defined area.

14. The method of claim 1, further comprising displaying only one or more allowed positions for the shape.

15. The method of claim 1, wherein the pre-defined area is based on pre-defined rules described in an architecture file.

16. The method of claim 15, wherein grid values are included in the architecture file.

17. The method of claim 16, wherein the grid values include centering attributes for different layers of the grid.

18. The method of claim 16, wherein the grid values include edge attributes for the shape.

19. A non-transitory computer-readable medium having stored thereon a plurality of computer-executable instructions which, when executed by a computer, cause the computer to:
receive a request to activate a grid;
receive, from an input device, a request to place at least one edge of a shape at a location on the grid; and
automatically place the at least one edge of the shape in a pre-defined area of the grid when the location of the request is within a threshold position of the pre-defined area.

20. A device, comprising:
a computer system having a processor and a memory having stored thereon a plurality of executable instructions which, when executed by the processor, cause the processor to:
receive a request to activate a grid;
receive, from an input device, a request to place at least one edge of a shape at a location on the grid; and
automatically place the at least one edge of the shape in a pre-defined area of the grid when the location of the request is within a threshold position of the pre-defined area.

\* \* \* \* \*